United States Patent
Jeong

(10) Patent No.: US 10,912,006 B2
(45) Date of Patent: Feb. 2, 2021

(54) METHOD AND APPARATUS FOR MANAGING MOBILITY IN WIRELESS COMMUNICATION SYSTEM

(71) Applicant: SK TELECOM CO., LTD., Seoul (KR)

(72) Inventor: Sangsoo Jeong, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 16/468,212

(22) PCT Filed: Dec. 26, 2017

(86) PCT No.: PCT/KR2017/015465
§ 371 (c)(1),
(2) Date: Jun. 10, 2019

(87) PCT Pub. No.: WO2019/027110
PCT Pub. Date: Feb. 7, 2019

(65) Prior Publication Data
US 2019/0394698 A1    Dec. 26, 2019

(30) Foreign Application Priority Data
Aug. 1, 2017  (KR) .......................... 10-2017-0097743

(51) Int. Cl.
*H04W 36/32*    (2009.01)
*H04W 76/27*    (2018.01)
(Continued)

(52) U.S. Cl.
CPC ............. *H04W 36/32* (2013.01); *H04W 8/08* (2013.01); *H04W 36/0061* (2013.01);
(Continued)

(58) Field of Classification Search
CPC ....... H04W 36/32; H04W 76/27; H04W 8/08; H04W 36/0061; H04W 36/08;
(Continued)

(56) References Cited

U.S. PATENT DOCUMENTS 9,326,122 B2 *  4/2016  Xiong .................. H04W 76/27
9,564,958 B2 *  2/2017  Martinez Tarradell .....................
                                                       H04W 4/70
(Continued)

FOREIGN PATENT DOCUMENTS

CN    102104855    6/2011
CN    102740230    10/2012
(Continued)

OTHER PUBLICATIONS

International Search Report dated Apr. 30, 2018 issued in Application No. PCT/ KR2017 / 015465.
(Continued)

*Primary Examiner* — Sharad Rampuria
(74) *Attorney, Agent, or Firm* — KED & Associates, LLP

(57) ABSTRACT

The present disclosure in an aspect provides a method of managing mobility of a UE in a wireless communication system, including 1) determining in an RRC inactive state (an RRC inactive mode), whether to change a serving cell that is currently attached, 2) when determining to change the serving cell, receiving a system information from a target cell, and checking, based on the system information, whether a base station that controls the serving cell is identical to or different from a base station that controls the target cell, and 3) depending on identity or difference between the base station that controls the target cell and the base station that controls the serving cell, performing i) releasing an RRC-connection to thereby transition into an idle state, or ii) a cell change procedure to the target cell.

20 Claims, 10 Drawing Sheets

(51) Int. Cl.

| | | |
|---|---|---|
| *H04W 8/08* | (2009.01) | |
| *H04W 36/00* | (2009.01) | |
| *H04W 36/08* | (2009.01) | |
| *H04W 36/30* | (2009.01) | |
| *H04W 68/00* | (2009.01) | |

(52) U.S. Cl.
CPC ........... *H04W 36/08* (2013.01); *H04W 36/30* (2013.01); *H04W 68/005* (2013.01); *H04W 76/27* (2018.02)

(58) Field of Classification Search
CPC ... H04W 36/30; H04W 68/005; H04W 36/00; H04W 36/0005; H04W 36/0007; H04W 36/0009; H04W 36/0016; H04W 36/03; Y02D 70/00; H04B 7/18541; H04L 47/767

See application file for complete search history.

(56) References Cited

U.S. PATENT DOCUMENTS

| | | | |
|---|---|---|---|
| 10,321,294 B2* | 6/2019 | Chatterjee | ......... H04W 52/0219 |
| 2011/0130141 A1 | 6/2011 | Frost et al. | |
| 2014/0018085 A1 | 1/2014 | Young et al. | |
| 2015/0365859 A1 | 12/2015 | Dalsgaard et al. | |
| 2016/0157219 A1 | 6/2016 | Uemura et al. | |
| 2018/0199243 A1* | 7/2018 | Bharatia | ........... H04W 36/0027 |
| 2018/0234894 A1 | 8/2018 | Jiang | |
| 2019/0116486 A1* | 4/2019 | Kim | ........................ H04W 8/10 |

FOREIGN PATENT DOCUMENTS

| | | |
|---|---|---|
| CN | 104186011 | 12/2014 |
| CN | 104937980 | 9/2015 |
| CN | 105340343 | 2/2016 |
| CN | 106465293 | 2/2017 |
| CN | 106658758 | 5/2017 |
| KR | 10-2014-0010523 | 1/2014 |
| KR | 10-2017-0060182 | 5/2017 |
| WO | WO 2014/185702 | 11/2014 |
| WO | WO 2016/008800 | 1/2016 |

OTHER PUBLICATIONS

LG Electronics Inc., "Inter-RAT Mobility from RRC_INACTIVE". R2-1 704547, 3GPP TSG-RAN WG2 Meeting #98, Hangzhou, China May 4, 2017 See section 2 and figure 1.

LG Electronics Inc., "Inter-RAT Mobility from RRC_INACTIVE", R2-1707150, 3GPP TSG RAN2 AH Meeting, Qingdao, China, Jun. 16, 2017 See section 2.

"3 GPP; TSG RAN; NR; NR and NG-RAN Overall Description; Stage 2 (Release 15)", 3GPP TS 38.300 V0.4.1, Jun. 12, 2017 See sections 9.2.1.2, 9.2.2.1-9.2.2.3; and figure 9.2.3.2.1-1.

Chinese Office Action (with English translation) dated Nov. 19, 2020 issued in CN Application No. 201780077099.7.

\* cited by examiner

1000

1100

METHOD AND APPARATUS FOR MANAGING MOBILITY IN WIRELESS COMMUNICATION SYSTEM

CROSS-REFERENCE TO RELATED PATENT APPLICATIONS

This application is a U.S. National Stage Application under 35 U.S.C. § 371 of PCT Application No. PCT/KR2017/015465, filed Dec. 26, 2017, which claims priority to Korean Patent Application No. 10-2017-0097743, filed Aug. 1, 2017, whose entire disclosures are hereby incorporated by reference.

FIELD OF INVENTION

The present disclosure in some embodiments relates to a method and apparatus for mobility management in a wireless communication system.

BACKGROUND

The statements in this section merely provide background information related to the present disclosure and do not necessarily constitute prior art.

A terminal attached to a network in an existing wireless communication system (e.g., EPS or LTE) has two states of "ECM-CONNECTED" and "ECM-IDLE" selectively based on the presence or absence of a non-access stratum (NAS) signaling connection (or ECM connection). For the ECM connection, the terminal and a base station need to have a radio resource control (RRC) connection established therebetween, and depending on its RRC connection or non-RRC connection, the terminal has two states of "RRC-CONNECTED" and "RRC-IDLE" selectively. In the RRC-CONNECTED state, which is also referred to as a connected mode, the terminal can immediately transmit/receive data when generated. However, this requires the terminal to have handover and measurement procedures for mobility support. Meanwhile, in the RRC-IDLE state which is also called an idle mode, the terminal can not immediately transmit/receive data when generated, but it requires no handover and measurement procedures. However, for the idle state to transmit and receive data when generated, it needs to transition to a connected mode, involving generation of signaling and a transfer delay or latency in the process.

SUMMARY

The present disclosure in some embodiments seeks to provide a method and apparatus for mobility management in a wireless communication system, which can relieve a UE of signaling load and battery consumption and reduce the system latency by introducing a new state capable of reducing a load on the UE in its connected mode while taking advantage of the strength in the connected mode of the UE.

At least one aspect of the present disclosure provides a mobility management method of a user equipment (UE) in a wireless communication system, including 1) determining, in an RRC inactive state (an RRC inactive mode), whether to change a serving cell that is currently attached, 2) when determining to change the serving cell, receiving a system information from a target cell, and checking, based on the system information, whether a base station that controls the serving cell is identical to or different from a base station that controls the target cell, and 3) depending on identity or difference between the base station that controls the target cell and the base station that controls the serving cell, performing i) releasing an RRC-connection to thereby transition into an idle state, or ii) a cell change procedure to the target cell.

At least one aspect of the present disclosure provides a mobility management method of a base station in a wireless communication system, including 1) receiving a cell change request message from a user equipment (UE) in an RRC inactive state (an RRC inactive mode), 2) checking whether the base station is identical to or different from a base station that controls a target cell to which a cell change was requested by the UE, and 3) depending on identity or difference between the base station and the base station that controls the target cell, performing i) a handover procedure to the base station that controls the target cell, or ii) a cell change procedure to the target cell.

At least one aspect of the present disclosure provides a terminal device for managing mobility in a wireless communication system, including a transceiver unit configured to transmit and receive signals, and a control unit. The control unit is configured to determine, in an RRC inactive state (an RRC inactive mode), whether to change a serving cell currently attached. The control unit is further configured to, upon determining to change the serving cell, receive a system information from a target cell, checking, based on the system information, whether a base station that controls the serving cell is identical to or different from a base station that controls the target cell, and depending on identity or difference between the base station that controls the serving cell and the base station that controls the target cell, perform i) releasing an RRC connection to thereby transition into an idle state, or ii) a cell change procedure to the target cell.

At least one aspect of the present disclosure provides a base station apparatus for managing mobility in a wireless communication system, including a transceiver unit configured to transmit and receive signals, and a control unit. The control unit is configured to receive a cell change request message from a user equipment (UE) in an RRC inactive state (an RRC inactive mode), and check whether the base station apparatus is identical to or different from a base station that controls a target cell to which a cell change was requested by the UE. The control unit is further configured to, depending on identity or difference between the base station apparatus and the base station that controls the target cell, perform, i) a handover procedure from the base station that controls the target cell, or ii) a cell change procedure to the target cell.

According to some embodiments of the present disclosure, compared to the RRC-connected state of a user equipment (UE), the battery consumption of the UE and the network signaling load thereon can be greatly reduced. In addition, the data latency can be significantly reduced compared to the RRC-idle state.

DETAILED DESCRIPTION

Figure 1:
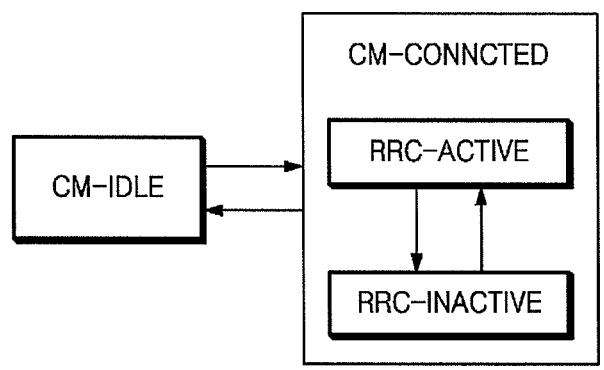
FIG. 1 is a state model of a user equipment (UE) in a wireless communication system according to at least one embodiment of the present disclosure.

Before specific description of the present disclosure, examples of interpretable meanings of the terms used herein are provided. However, it should be noted that the following examples are not meant to be limiting.

A base station is an entity communicating with a UE, and provide a link to a core network. The base station may be referred to as a BS, a NodeB (NB), an eNodeB (eNB), a gNodeB (gNB), or the like.

A user equipment is an entity communicating with a base station, and may be fixed or mobile. A user equipment may be referred to as a UE, a mobile station (MS), a mobile equipment (ME), a terminal, or the like.

Access and Mobility Management Function (AMF) is the termination of a Radio Access Network (RAN) Control Plane (CP) interface (e.g., N2), and terminates Non-Access Stratum (NAS). The AMF supports functions such as registration management, connection management, reachability management, mobility management, access authentication and access authorization. The AMF may be implemented in a form that software of the above functions is loaded on a single virtualized network device. In other words, the AMF may be implemented as a virtualized node rather than a physical node.

User Plane Function (UPF) supports functions such as anchor points for Intra/Inter-RAT mobility, external PDU session points for interconnection to the data network, packet routing and forwarding, user plane portions of packet inspection and policy rule enforcement, traffic usage reporting, uplink classification supporting traffic flow routing to the data network, uplink traffic verification, downlink packet buffering, downlink data notification triggering, or the like. The UPF may be implemented in a form in which software of the above functions is loaded on a single virtualized network device. In other words, the UPF may be implemented as a virtual node rather than a physical node.

This specification illustrates a wireless communication system capable of providing a multiple connectivity service to a UE by linking a plurality of different wireless access technologies where an existing wireless communication system coexists with a next generation wireless communication system. At least one embodiment of the present disclosure will be described taking a Long Term Evolution (LTE) or 4G system as an example of a conventional wireless communication system, and taking a 5G system or a New Radio (NR) system as a next generation wireless communication system. However, this is only an example, and other wireless communication system may be included at least partly.

Hereinafter, some embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity. In addition, the terms such as "unit," "module," and the like refer to units for processing at least one function or operation, which may be implemented by hardware, software, or a combination thereof.

FIG. 1 is a state model of a UE in a wireless communication system according to an embodiment of the present disclosure.

In the wireless communication system according to at least one embodiment of the present disclosure, there are two types of registration management (RM) states, "RM-DEREGISTERED" and "RM-REGISTERED," depending on whether or not the UE is registered with the network in the selected PLMN. In the RM-REGISTERED state, the UE has two connection management (CM) states, "CM-IDLE" and "CM-CONNECTED," depending on whether or not a Non-Access Stratum (NAS) signaling connection is established with Access and Mobility Management Function (AMF). Here, the NAS signaling connection includes both an access network (AN) signaling connection between the UE and the base station and an N2 connection between the base station and the AMF. An example of an AN signaling connection is a Radio Resource Control (RRC) connection.

The UE in the CM-IDLE state, while it establishes no NAS signaling connection with the AMF, may perform cell selection, cell reselection, and PLMN selection. The UE in the CM-CONNECTED state, while it establishes the NAS signaling connection with the AMF, may have the status details of "RRC-ACTIVE" and "RRC-INACTIVE." When the UE is in the RRC-INACTIVE state (hereinafter can be also referred to as 'RRC inactive mode'), the following applies.

UE, reachability managed by the base station by using the support information from the core network UE, paging managed by the base station UE, monitoring the paging by using the core network and base station identification information In the RRC inactive state, the NAS signaling connection is maintained between the UE and the AMF, but the RRC-connected state is inactivated between the UE and the base station. This RRC inactive state reduces the signaling load and latency due to the transition between the existing RRC-CONNECTED state (hereinafter referred to as 'connected state') and the RRC-IDLE state (hereinafter referred to as 'idle state'), and reduces UE battery consumption. The introduction of this RRC inactive state can support an appropriate level of service quality and mobility in consideration of a service characteristic of a user. In the RRC inactive state, the cell to which the UE connects or camps may be changed by the movement of the UE or the change of the radio state.

As a technology for supporting an RRC inactive state, the present disclosure in some embodiments provide a mobility management method and apparatus capable of effectively updating a cell change when the cell is changed due to movement of a UE in the RRC inactive state or due to a radio state change. Hereinafter, some embodiments will be described in detail with reference to the drawings.

Figure 2:
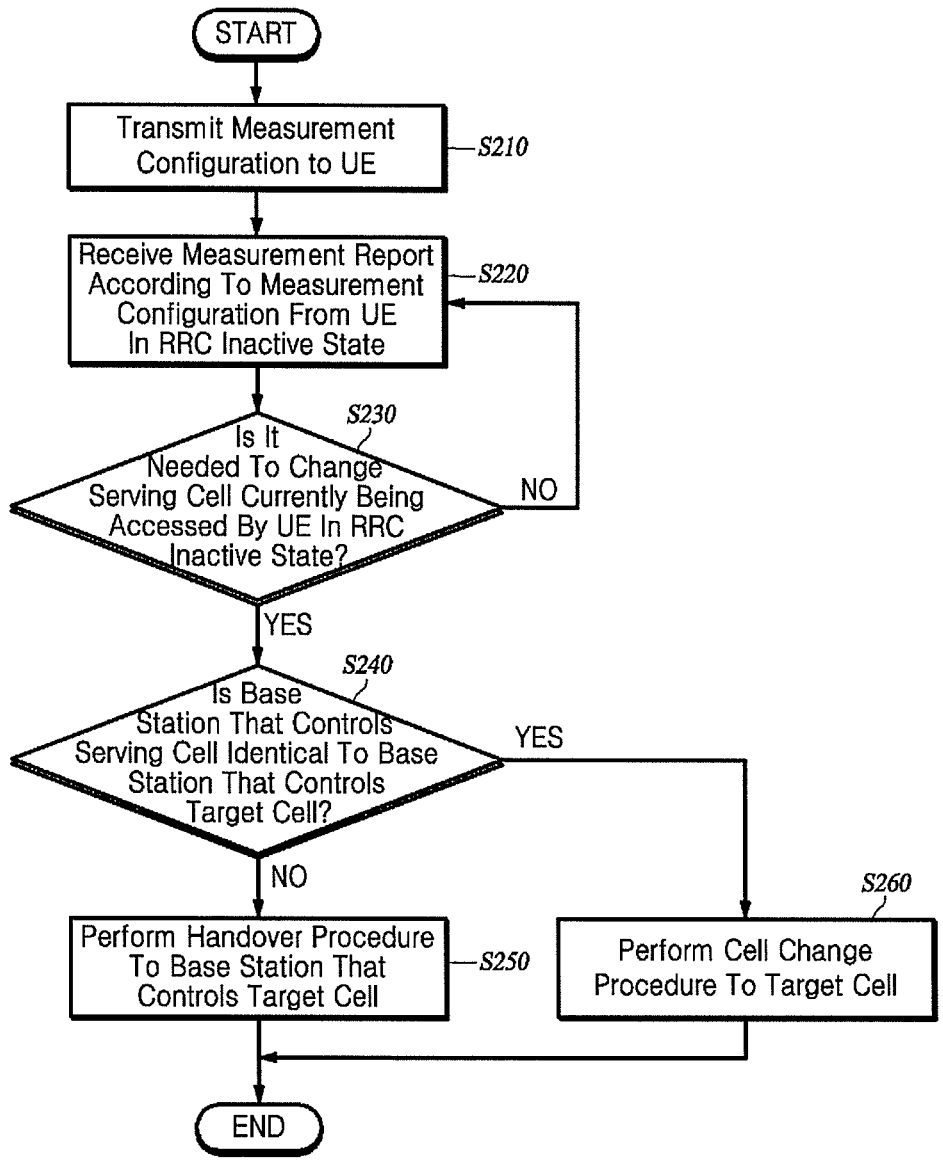
FIG. 2 is a flowchart of a mobility management method of a base station, according to at least one embodiment of the present disclosure.

FIG. 2 is a flowchart of a mobility management method of a base station, according to an embodiment of the present disclosure.

The base station transmits a measurement configuration to a UE in Step S210. The measurement configuration is a configuration related to whether to report the received signal strength to the base station when an event occurs to the UE. The measurement configuration may be transmitted to the UE through an RRC connection reconfiguration message when the base station establishes the RRC-connected state with the UE, or it may be transmitted to the UE after the UE transitions from its connected state to the RRC inactive state. Upon receiving the measurement configuration, the UE measures the received signal strength of the serving cell and the neighboring cells until it detects the relevant event (i.e., triggering event for causing reporting of a measurement result) for sending a measurement report message for the measurement result.

The UE may transmit the measurement report to the base station following a predetermined condition even after the transition to the RRC inactive state. When the base station receives the measurement report according to the measurement configuration from the UE in RRC inactive state (S220), the base station determines, based on various information including the received measurement report, whether to change the serving cell currently being accessed by the UE in RRC inactive state (S230). The base station may determine whether a change of the serving cell is needed and, if yes, to which cell the serving cell is to be changed.

The base station determines, upon determining to change the serving cell, whether it is the same base station as the controlling station of the target cell, that is, whether the serving-cell controlling BS is identical to or different from the target-cell controlling BS (S240). In other words, the base station determines whether the target cell belongs to the cells it controls. The base station performs, base on the determination result, a handover procedure to a base station that controls the target cell, or a cell change procedure to the target cell. Specifically, when the base station determines that it is not a target-cell controlling BS, it performs the handover procedure to the target-cell controlling BS (S250). Otherwise, when the base station determines that it is the target-cell controlling BS, it performs the cell change procedure to the target cell (S260).

The base station, in the cell changing procedure, may update the cell information in the previously stored context information of the UE in RRC inactive state, and transmit the updated cell information to the UE in RRC inactive state. The updated cell information may include at least one of an identifier of the target cell, a temporary identifier of the UE, resource allocation information, information for ciphering, and information for an integrity check.

Figure 3:
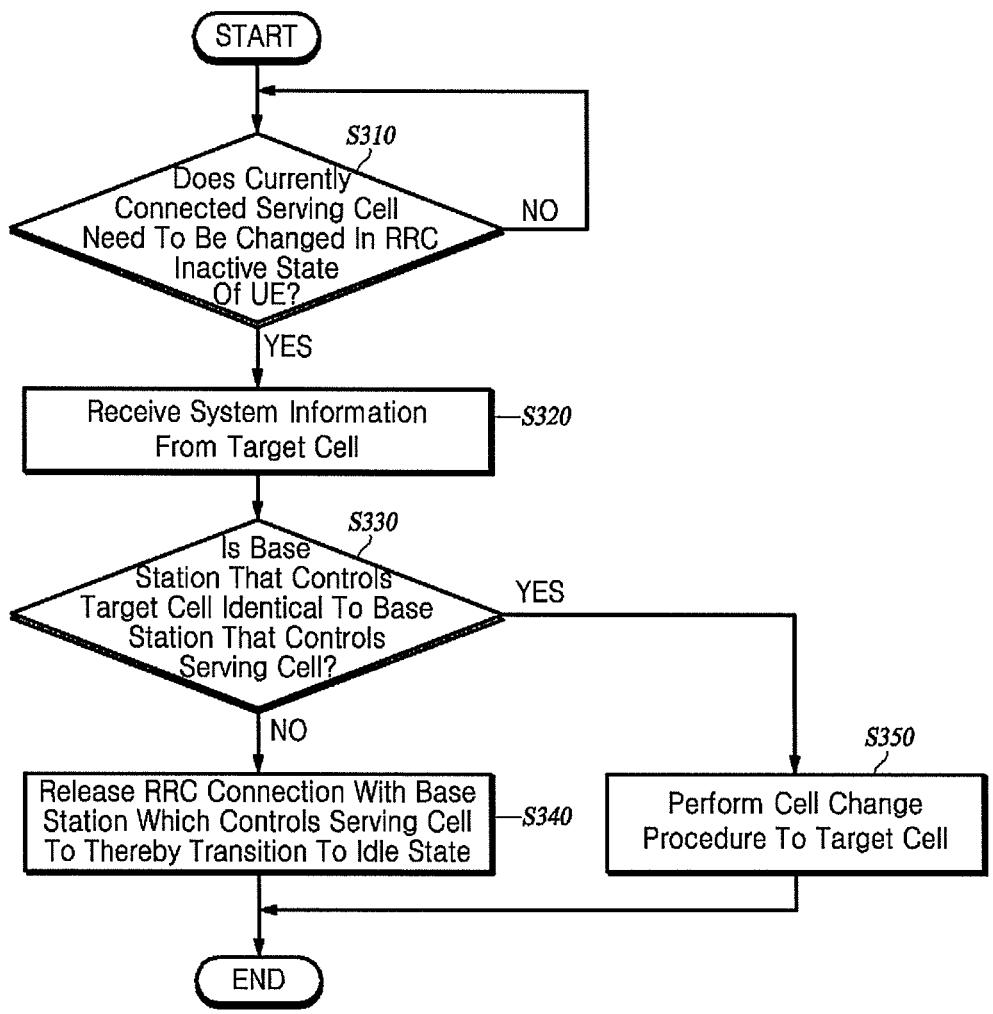
FIG. 3 is a flowchart of a mobility management method of a UE, according to at least one embodiment of the present disclosure.

FIG. 3 is a flowchart of a mobility management method of a UE, according to at least one embodiment of the present disclosure. The UE of this embodiment is in the RRC inactive state.

The UE in RRC inactive state determines whether to change the currently connected serving cell (S310). At this time, the UE may determine whether to change the serving cell based on at least one of a radio signal strength of a serving cell, a radio signal strength of one or more neighboring cells, an offset of the serving cell and each of one or more neighboring cells, and how long a condition for the UE to make a cell change lasts. Determining whether or not to change the serving cell may also include determining the target cell to be changed. In this embodiment, the UE in RRC inactive state does not provide the measurement report to the base station, and therefore, the UE determines the cell change autonomously.

When it determines to change the serving cell, the UE in RRC inactive state receives system information from the target cell (S320). Here, the system information includes essential information and optional information as information that one cell broadcasts. For example, essential system information may include Master Information Block (MIB), System Information Block (SIB) 1, and SIB 2. The UE may obtain, from the system information, the cell identifier and information on the base station that controls the cell.

The UE in RRC inactive state determines, based on the received system information, whether the base station controlling the target cell is identical to or different from the base station controlling the serving cell (S330). The UE may determine the identity or difference based on the target cell identifier obtained from the system information, and information on the base station controlling the target cell.

The UE in RRC inactive state performs, depending on the identity or difference between the base station controlling the target cell and the base station controlling the serving cell, i) releasing the RRC connection with the base station to which the UE currently registered, to thereby transition to the idle state, or ii) the cell change procedure to the target cell. Specifically, when the base station controlling the target cell is not identical to the base station controlling the serving cell, the UE transitions from the RRC inactive state to the idle state (S340), and if not, it performs the cell change procedure to the target cell (S350). The cell change procedure to the target cell in the currently connected base station may be started by the UE transmitting the cell change request message including information on the target cell to the base station.

When Step S340 causes the RRC-connected state to be released and the UE enters the target cell controlled by the new base station, the UE is unable to receive the paging transmitted by the existing base station at the occurrence of mobile terminated (MT) data (i.e., downlink data). Therefore, there is a need for techniques that can effectively handle paging in such situations. Hereinafter, some embodiments as for the techniques will be described in detail with reference to FIGS. 4 and 5.

Figure 4:
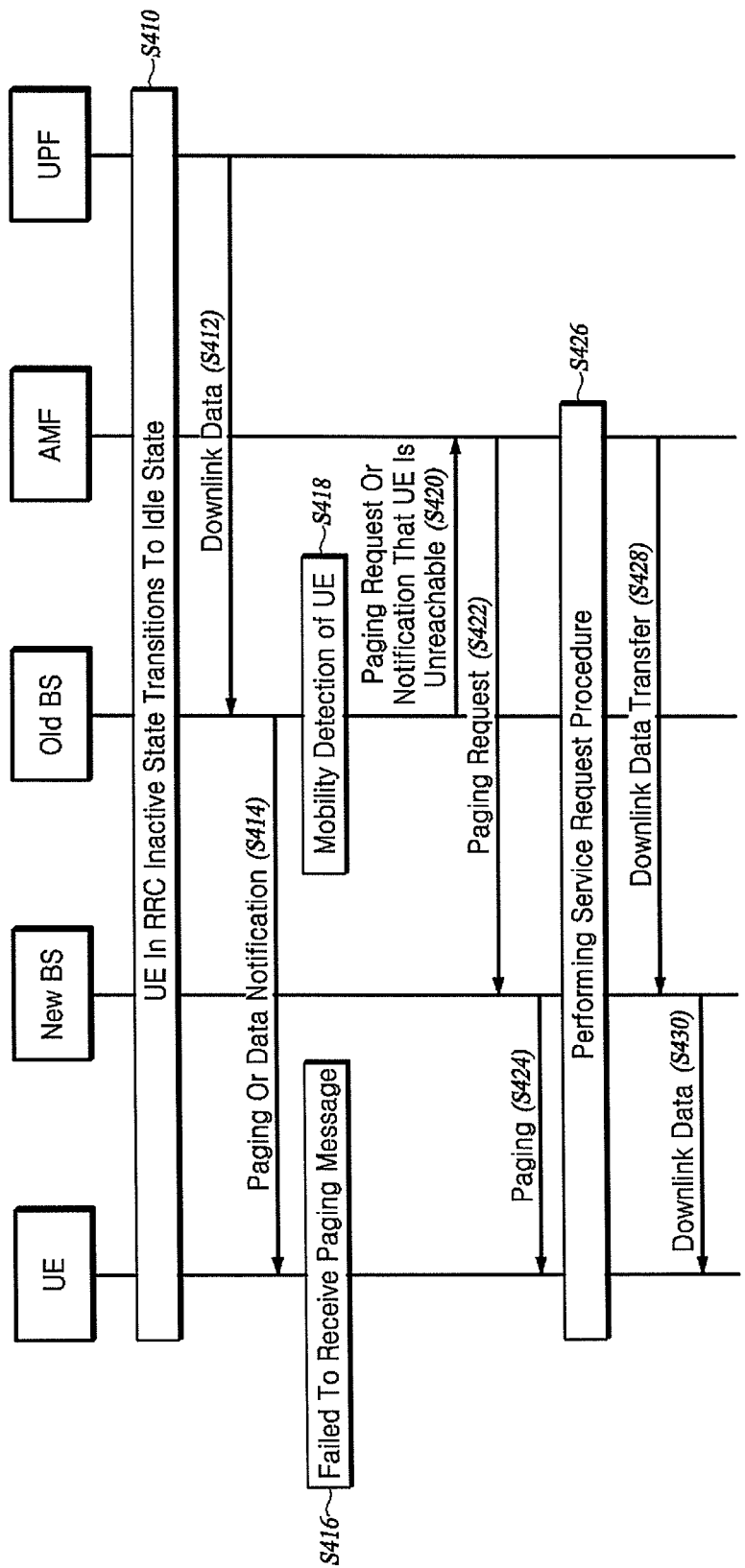
FIG. 4 is a flowchart of a paging procedure performed after a UE in RRC inactive state releases an RRC-connected state due to a cell change, according to at least one embodiment of the present disclosure.

FIG. 4 is a flowchart of a paging procedure performed after a UE in RRC inactive state releases RRC-connected state due to a cell change, according to an embodiment of the present disclosure. In FIG. 4, an old base station (old BS) refers to a base station to which the UE in RRC inactive state had been attached before it transitioned to the idle state according to the cell change, that is, the base station that controls the serving cell. A new base station (new BS) refers to a base station after change following a cell change performed by the UE in RRC inactive state, that is, the base station that controls the target cell.

In the present embodiment, the UE in RRC inactive state transitions to the idle state as shown in FIG. 3, following a change of cell to the cell controlled by the new base station that is not currently attached (S410). When downlink data is generated for the UE, the User Plane Function (UPF) transmits the downlink data (GTP-U packet) to the old BS (S412).

The old BS transmits to the UE, a message informing the downlink data generation (data notification message) or a paging message (S414). At this time, the old BS may use a temporary identifier (e.g., L2 ID) it has assigned to the UE. However, the UE cannot receive a message from the old BS since the UE is in idle state after the RRC-connected state with the old BS was released. Accordingly, the UE fails to receive the data notification message or the paging message (S416).

The old BS does not have a paging response from the UE, so it can recognize that the current UE cannot receive paging (S418). In other words, the old BS can detect the mobility of the UE. Accordingly, the old BS may transmit a message including at least one of a paging request and a notification that the UE is in unreachable status to the AMF (S420). At this time, the old BS may transmit the relevant message after including downlink data received from the UPF to the AMF.

The AMF is responsive to the message received from the old BS for transmitting a paging request message to the new BS (S422). At this time, the AMF may use a temporary identifier (e.g., L3 ID) that it has assigned to the UE. In Step S422, the AMF may send a paging request message to one or more base stations including the new BS. For example, when a tracking area (TA) is set for each base station (that is, when a group of cells controlled by one base station is set as TA), the AMF is supposed to transmit a paging request message only to the new BS. As another example, when a TA is set up for each group of a plurality of base stations, the AMF transmits a paging request message to a plurality of base stations including a new BS belonging to one TA.

The new BS in receipt of the paging request message from the AMF performs a paging process with the UE (S424). The UE is responsive to the paging message from the new BS for performing a service request procedure (S426). In accordance with the service request procedure, the UE establishes an RRC-connected state with a new BS. Accordingly, the new BS receives the downlink data transferred from the AMF (S428), and transmits it to the UE (S430).

Figure 5:
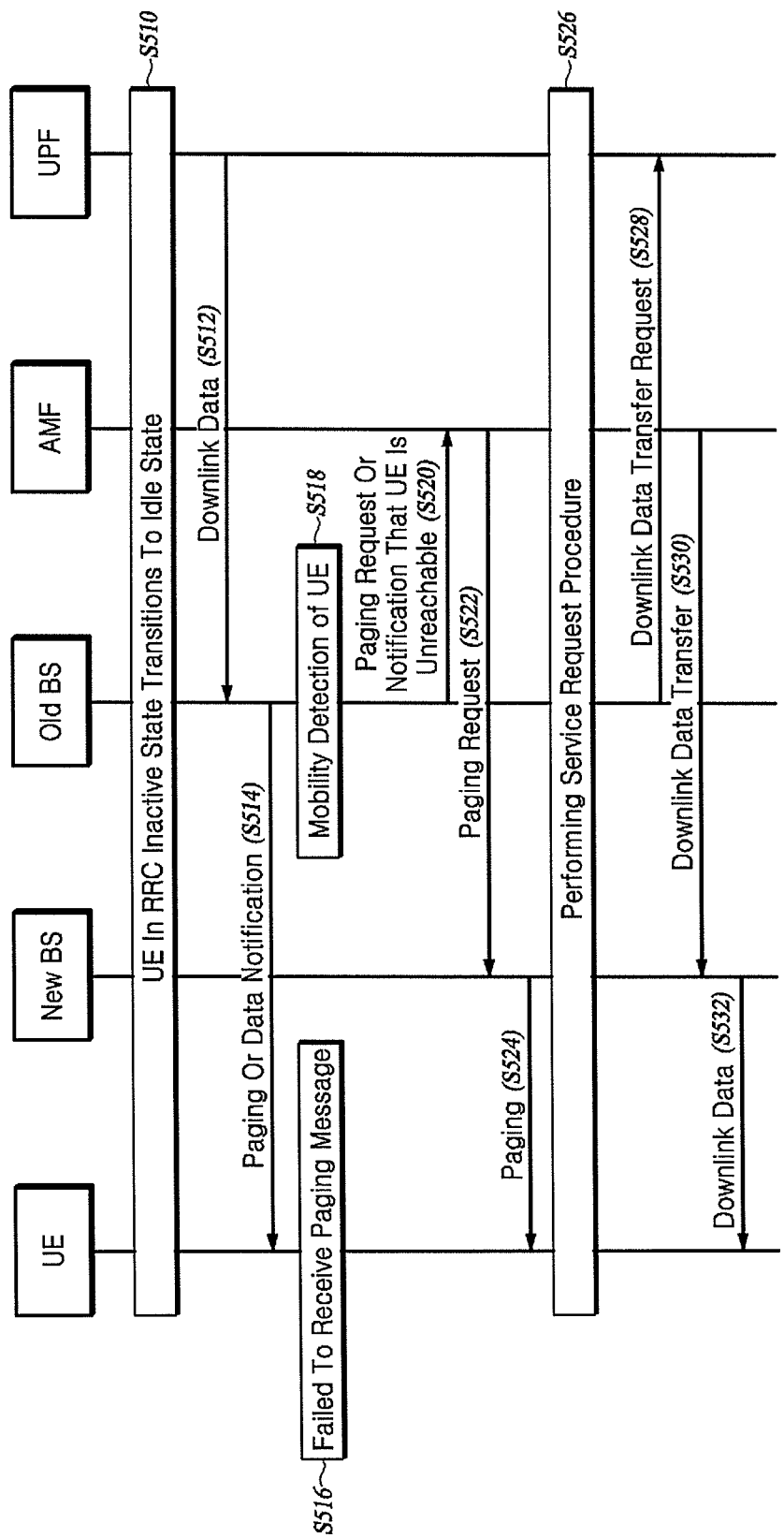
FIG. 5 is a flowchart of a paging procedure performed after a UE in RRC inactive state releases an RRC-connected state due to a cell change, according to another embodiment of the present disclosure.

FIG. 5 is a flowchart of a paging procedure performed after a UE in RRC inactive state releases an RRC-connected state due to a cell change, according to another embodiment of the present disclosure.

In this embodiment, Steps S510 to S526 are similar to Steps S410 to S426 of FIG. 4 described above, so a detailed description thereof will be omitted. However, different from that of FIG. 4, when the old BS in this embodiment transmits a message including at least one of a paging request and a notification that the UE is in unreachable status to the AMF (S520), it does not transmit downlink data received from the UPF.

When the UE is responsive to the paging for performing a service request procedure, whereby establishing an RRC-connected state with a new BS (S526), the old BS transmits its received downlink data for the UE back to the UPF (S528). The reason for this may be that the downlink data retransmission is required due to the base station change. In other words, the old BS may transmit the downlink data back to the UPF, and it may request that the retransmission be forwarded to the new BS.

The UPF transmits the downlink data received from the old BS to the new BS in Step S530, and receives the downlink data through the new BS in Step S532.

Figure 6:
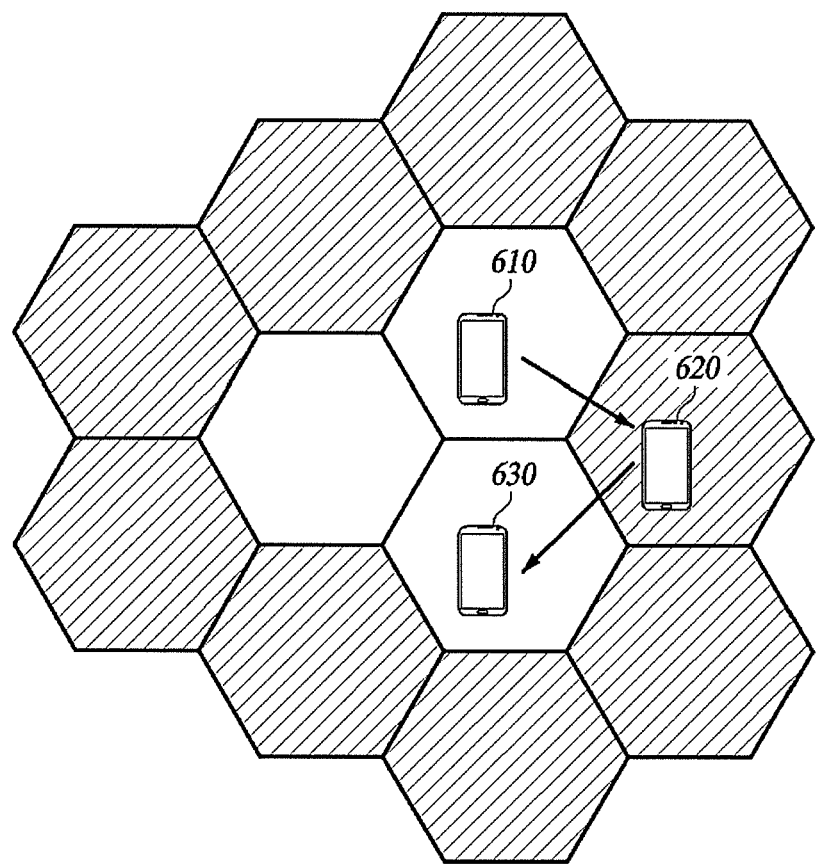
FIG. 6 is an exemplary diagram of a plurality of cells controlled by a single base station and moving UEs in an RRC inactive state.

FIG. 6 is an exemplary diagram of a plurality of cells controlled by a single base station and moving UEs in an RRC inactive state.

A plurality of cells controlled by one base station may be divided into border cells and inner cells. A border cell is a cell close to a border between base stations, and means a cell adjacent or close to a cell controlled by another base station. A border cell is a cell located in a certain range from a border between base stations, and may be variously set according to an embodiment. The inner cell means a cell belonging to an area surrounded by border cells. In FIG. 6, the border cells are represented by hatched areas, the UEs 610 and 630 in RRC inactive state are located in the inner cells, and the UE 620 in RRC inactive is located in the border cell.

In general, when a UE is located in a border cell, it is close to a cell controlled by another base station. Therefore, cell change is highly likely to change the base station. In other words, a UE located in a border cell is likely to make a cell change to a cell controlled by another base station. Accordingly, in the mobility management in the RRC inactive state, distinguishing the case where the UE is located in the border cell from the case where the UE is located in the internal cell, can more efficiently reduce battery consumption and signaling load of the UE. Hereinafter, this will be described in detail with reference to FIGS. 7 to 9.

Figure 7:
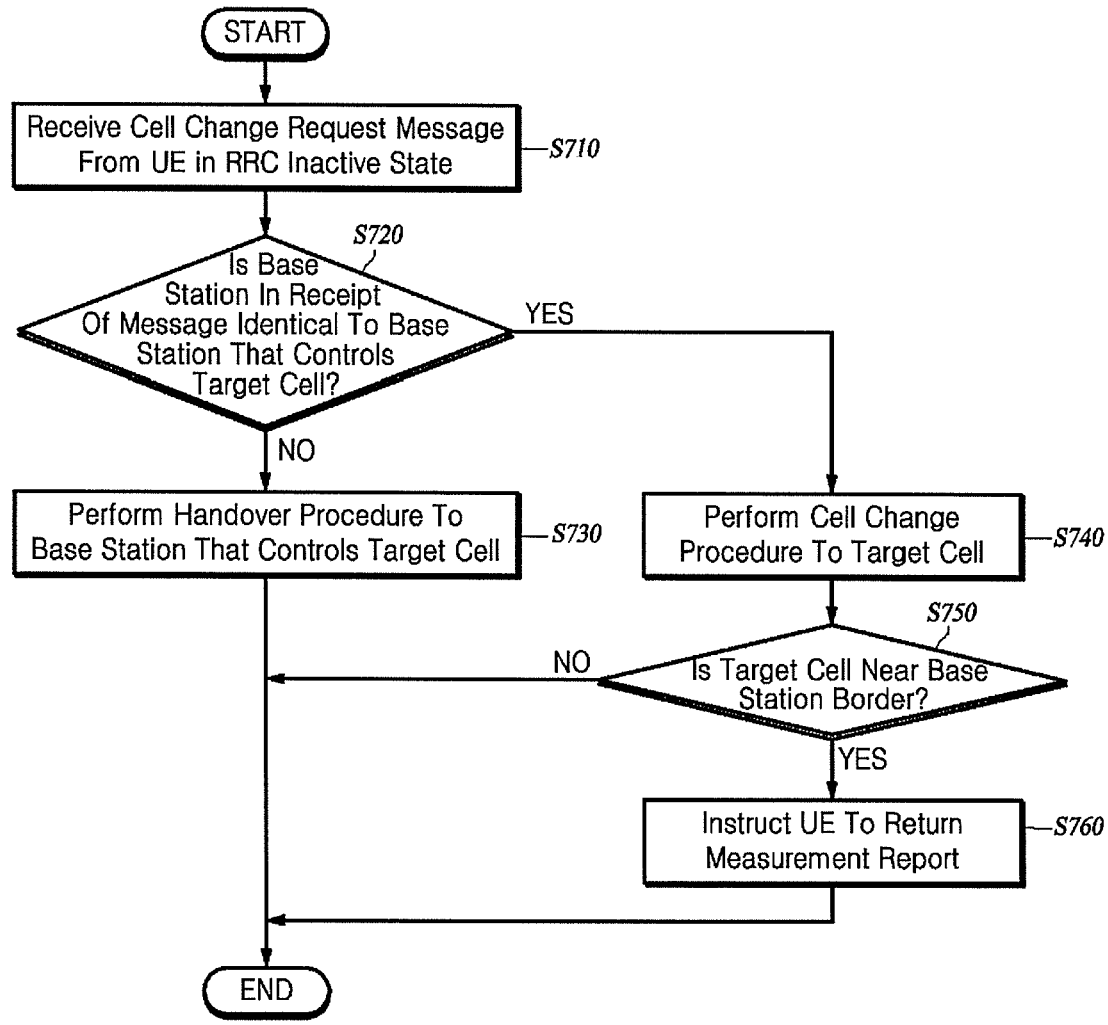
FIG. 7 is a flowchart of a mobility management method of a base station, according to yet another embodiment of the present disclosure.

FIG. 7 is a flowchart illustrating a mobility management method of a base station, according to yet another embodiment of the present disclosure.

In at least one embodiment, the UE in RRC inactive state autonomously determines the cell change without providing a measurement report to the base station, and the base station receives the cell change request message from the UE when the cell is changed by the UE in RRC inactive state. However, when the UE in RRC inactive state is located in the border cell (i.e., when the base station is likely to change), the base station provides the measurement report to the base station. The UE in RRC inactive state located in the border cell can prevent the occurrence of paging loss as shown in FIGS. 4 and 5 by providing the measurement report to the base station.

Referring to FIG. 7, the base station receives a cell change request message from a UE in RRC inactive state (S710). The base station in receipt of the cell change request message, checks whether it is identical to the base station that controls the target cell to which the UE has requested the cell change (S720). The base station performs, depending on the identity or difference between the base station in receipt of the message and the base station controlling the target cell, a handover procedure to a base station that controls the target cell, or a cell change procedure to the target cell.

When the base station in receipt of the message finds it is not identical to the base station controlling the target cell, it performs the handover procedure to the base station that controls the target cell (S730). When it find it is the same, the base station performs the cell change procedure to the target cell (S740). The base station, in the cell changing procedure, may update the cell information in the previously stored context information of the UE in RRC inactive state, and transmit the updated cell information to the UE in RRC inactive state. The updated cell information may include at least one of an identifier of the target cell, a temporary identifier of the UE, resource allocation information, information for ciphering, and information for an integrity check.

After the start of the cell changing procedure, the base station may check whether the target cell is a border cell (S750). When it determines that the target cell is a border cell, the base station may instruct to transmit the measurement report to the UE in RRC inactive state (S760). For the purpose of instructing to transmit the measurement report, the base station may send the measurement configuration to the UE in RRC inactive state. Upon receiving the measurement configuration, the UE in RRC inactive mode transmits the measurement report to the base station according to the measurement configuration.

In another example, the base station may instruct to provide a measurement report by sending a notification that the target cell is a border cell to the UE in RRC inactive mode. In that case, the UE receives in advance a measurement configuration including an event that the UE is located in a border cell as a triggering event for stipulating a transmission of the measurement configuration by the UE in RRC inactive mode (e.g., the UE receives in advance when in the RRC-connected state, the measurement configuration), and upon receiving the notification that the target cell is a border cell from the base station, the UE transmits the measurement report to the base station.

Then, the base station determines whether to change the border cell to which the UE is currently attached based on the measurement report received from the UE. When the base station decides to change the border cell to which the UE is currently attached into an inner cell located inside border cells controlled by the base station, the base station instructs the UE not to provide the measurement report any more. In other words, the base station can reduce battery consumption and signaling load of the UE by having the measurement report provided only when the UE is located in the border cell.

As shown in FIG. 6, for example, the UE 610 in RRC inactive state moves to another cell to determine a cell change, and the UE 620 that has moved to another cell transmits a cell change request message to the base station. The base station performs a cell changing procedure because the target cell belongs to the cells controlled by the base station. The base station may recognize that the UE 620 is located in the border cell and instruct the UE 620 to provide the measurement report. The base station determines a cell change or a handover based on the measurement report received from the UE 620. Then, the UE 630 moved back to the inner cell transmits a second cell change request message to the base station. The base station is responsive to the message of the UE 630 requesting the cell change to the inner cell, for performing a cell changing procedure while instructing the UE 630 to provide the measurement report no more.

According to another embodiment of the present disclosure, the base station can manage mobility efficiently through a separate management of border cells among the cells under its management. In present exemplary embodiment, the system information broadcasted by border cells includes a flag or an indicator indicating the border cell identity. For example, embodiments may use some of the predetermined number of bits indicating the cell identifier included in the system information, for indicating whether the relevant cell is a border cell. Accordingly, the UE in RRC inactive state may recognize that the selected cell is a border cell by using the system information received from the border cell, determine whether to perform the measurement report by recognizing the border cell, and determine whether to request the cell change. Further detailed description will be provided with reference to FIGS. 8 and 9.

Figure 8:
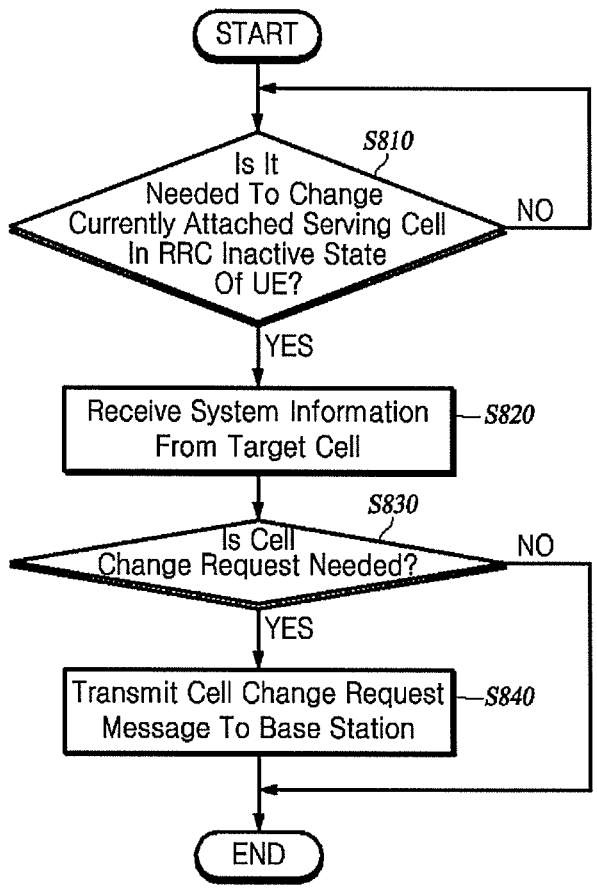
FIG. 8 is a flowchart of a mobility management method of a UE, according to yet another embodiment of the present disclosure.

FIG. 8 is a flowchart of a mobility management method of a UE, according to yet another embodiment of the present disclosure.

In the RRC inactive state, the UE determines whether it is needed to change the currently attached serving cell (S810). At this time, the UE may determine whether to change the serving cell based on at least one of a radio signal strength of a serving cell, a radio signal strength of one or more neighboring cells, an offset of the serving cell and each of one or more neighboring cells, and how long a condition for the UE to make a cell change lasts.

When it determines a cell change is needed, the UE in RRC inactive state receives system information from the target cell (S820). Here, the system information includes essential information and optional information as information that one cell broadcasts. For example, essential system information may include Master Information Block (MIB), System Information Block (SIB) 1, and SIB 2. The UE may obtain, from the system information, the cell identifier, information on the base station that controls the cell, and information on whether the cell is a border cell.

The UE in RRC inactive state determines whether the base station controlling the target cell is identical to the base station controlling the serving cell based on the received system information, and performs the cell changing procedure when the same base station equally controls the serving cell and the target cell. However, in this embodiment, the UE determines whether a cell change request to the base station is needed before performing the cell changing procedure (S830).

For example, the UE may check to see whether the target cell is a border cell of the base station controlling the serving cell, to determine whether a cell change request is required. In this case, when the target cell is a border cell, the UE transmits a cell change request message including information on the target cell to the base station controlling the serving cell (S840). When the target cell is not a border cell, the UE transmits no cell change request message. In addition, the UE may check its battery state to determine whether a cell change request is needed. In this case, when the battery state is below a predetermined level, the UE does not transmit a cell change request message including information on the target cell to the base station controlling the serving cell. As long as the battery state is not lower than the predetermined level, the UE does transmit a cell change request message to the base station.

Figure 9:
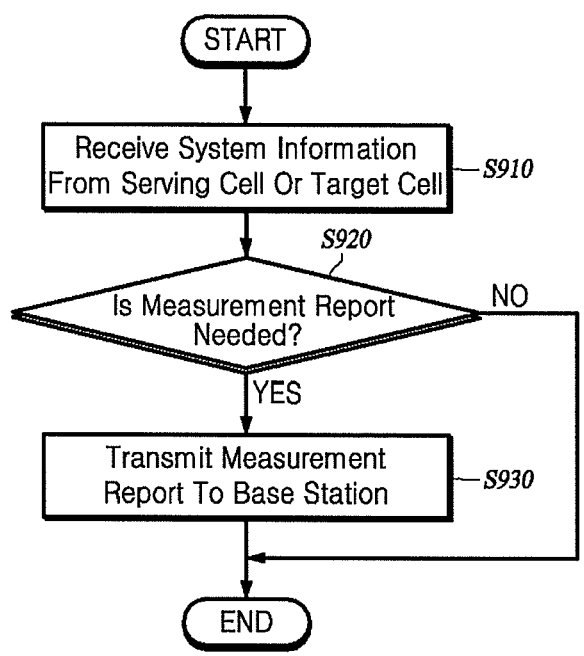
FIG. 9 is a flowchart of a mobility management method of a UE, according to yet another embodiment of the present disclosure.

FIG. 9 is a flowchart of a mobility management method of a UE, according to yet another embodiment of the present disclosure.

The UE in RRC inactive state may receive the system information from the target cell or the serving cell (S910). For example, the UE may determine the cell change to the target cell and receive the system information from the target cell or periodically receive the system information from the serving cell. The UE may obtain, from the system information, the cell identifier, information on the base station that controls the cell, and information on whether the cell is a border cell.

The UE in RRC inactive state may determine, based on the received system information, whether to transmit the measurement report to the base station (S920). For example, the UE may check, based on the system information, to see whether the target cell is a border cell of the base station that controls the serving cell, and determine whether to transmit the measurement report. In this case, when the target cell is a border cell, the UE transmits a measurement report according to the measurement configuration to the base station that controls the serving cell. When the target cell is not a border cell, the UE transmits no measurement report according to the measurement configuration to the base station that controls the serving cell.

In addition, the UE may determine whether to transmit a measurement report by checking its battery state. In this case, when the battery state goes below a preset level, the UE does not transmit the measurement report according to the measurement configuration to the base station that controls the serving cell, and as long as the battery state is not less than the preset level, the UE does transmit the measurement report according to the measurement configuration to the base station that controls the serving cell (S930).

The above description referring to FIGS. 6 to 9 is an illustration of a method of managing mobility by dividing cells controlled by one base station into two types, border cells and inner cells. However, embodiments of the present disclosure are not limited to the above, and the mobility can be managed by dividing cells controlled by one base station into a further variety of categories. For example, cells may be divided into cells located in the outermost region (the first group), cells located in the middle region (second group), and cells located in the innermost region (third group). At least one embodiment may provide the following setting: When the UE in RRC inactive state selects a cell belonging to the first group, it sends a measurement report and a cell change request message to the base station. When the UE selects the cell belonging to the second group, it provides no measurement report, while transmitting the cell change request message to the base station. When the UE selects the cell belonging to the third group, it transmits neither a measurement report nor a cell change request message to the base station.

Figure 10:
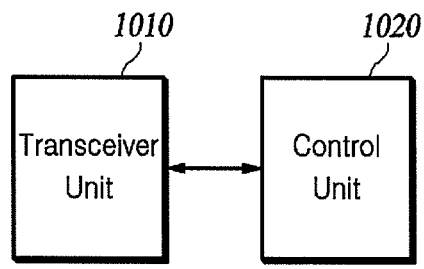
FIG. 10 is a schematic diagram of a configuration of a base station apparatus according to at least one embodiment of the present disclosure.

FIG. 10 is a schematic diagram of a configuration of a base station apparatus 1000 according to at least one embodiment of the present disclosure.

The base station apparatus 1000 includes a transmission/reception unit 1010 and a control unit 1020. Respective components of the base station apparatus 1000 may be implemented as a hardware chip, or may be implemented as software with a microprocessor being implemented to execute the software functions corresponding to the respective components.

The transmission/reception unit 1010 transmits and receives signals to perform communication with other network function nodes and UEs.

In at least one embodiment, the control unit 1020 receives a cell change request message from a UE in RRC inactive state, and determines whether the base station 1000 is identical to the base station that controls the target cell, to which the UE has requested to change. The control unit 1020 performs, depending on the identity or difference between the base station 1000 and the base station controlling the target cell, a handover procedure from the base station controlling the target cell, or a cell change procedure to the target cell.

In another embodiment, the control unit 1020 receives a measurement report from the UE in RRC inactive state, and determines, based on the received measurement report, whether the UE in RRC inactive state is to change the currently attached serving cell. When the control unit 1020 determines to change the serving cell, it performs a handover procedure to the base station controlling the target cell or performs a cell change procedure to the target set, according to whether the base station 1000 is identical to the base station controlling the target.

When the control unit 1020 finds that it is different from the base station controlling the target, it controls to perform the handover procedure to the base station controlling the target cell. When the control unit 1020 finds that the base station 1000 is identical to the base station controlling the target cell, it performs the cell change procedure to the target set.

Figure 11:
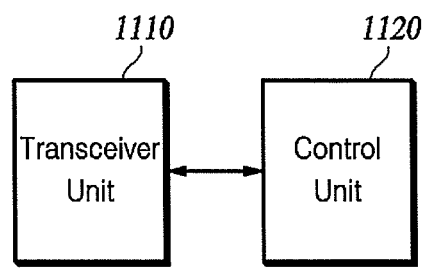
FIG. 11 is a schematic diagram of a configuration of a terminal device according to at least one embodiment of the present disclosure.

FIG. 11 is a schematic diagram of a configuration of a terminal device 1100 according to at least one embodiment of the present disclosure.

The terminal device 1100 includes a transmission/reception unit 1110 and a control unit 1120. The respective components of the terminal device 1100 may be implemented as a hardware chip, or may be implemented as software with a microprocessor implemented to execute the software functions corresponding to the respective components.

The transmission/reception unit 1110 transmits and receives signals to perform communication with other network function nodes and a base station.

The control unit 1120 in RRC inactive state determines whether to change the currently attached serving cell. When the control unit 1120 determines to change the serving cell, it receives system information from the target cell and determines, based on the received system information, whether the base station controlling the target cell is identical to the base station controlling the serving cell. The control unit 1120 performs, depending on the identity or difference between the base station controlling the target cell and the base station controlling the serving cell, releasing the RRC connection and thereby transitioning to an idle state, or a cell change procedure to the target cell.

Although the steps in FIGS. 2 to 5 and FIGS. 7 to 9 are described to be sequentially performed, they merely instantiate the technical idea of some embodiments of the present disclosure. In other words, various modifications, additions, and substitutions are possible by changing the sequences described in the respective drawings or by performing two or more of the steps in parallel, and hence the steps in FIGS. 2 to 5 and FIGS. 7 to 9 are not limited to the illustrated chronological sequences.

The mobility management method of some embodiments illustrated in FIGS. 2 to 5 and FIGS. 7 to 9 can be implemented by a program and can be recorded on a computer-readable recording medium. The computer-readable recording medium on which the program for implementing the mobility management method of some embodiments, includes any type of recording device on which data that can be read by a computer system are recordable.

Although exemplary embodiments of the present disclosure have been described for illustrative purposes, those skilled in the art will appreciate that various modifications, additions and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A method for managing mobility of a mobile terminal in telecommunication network, the method comprising:
    performing, by the mobile terminal in a Radio Resource Control (RRC)-INACTIVE state, measurements for a serving cell and at least one neighboring cell to enable a cell reselection process, wherein the mobile terminal in the RRC-INACTIVE state maintains a connection with an Access and Mobility Management Function (AMF) of a core network during the cell reselection process; and
    choosing, by the mobile terminal in the RRC-INACTIVE state, a cell to camp from the serving cell and at least one neighboring cell according to the measurements and a cell reselection criteria; and wherein a serving base station of the serving cell performs a paging of the mobile terminal in the RRC-INACTIVE state in response to the serving base station receiving downlink data associated with the mobile terminal in the RRC-INACTIVE state from a User Plane Function (UPF), of the core network.

2. The method of claim 1, further comprising:
monitoring, by the mobile terminal in the RRC-INACTIVE state, system information from the cell chosen in the cell reselection process.

3. The method of claim 1, further comprising:
by the serving base station, notifying the AMF of the core network that delivery of the downlink data has failed when the serving base station fails to contact the mobile terminal.

4. The method of claim 3, wherein, when delivery of the downlink data to the mobile terminal has failed and the cell chosen in the cell reselection process is controlled by another base station, the downlink data is forwarded to the other base station.

5. The method of claim 4, wherein the serving base station sends the downlink data to the AMF of the core network, when the serving base station fails to contact the mobile terminal when attempting delivery of the downlink data.

6. The method of claim 4, wherein the serving base station sends the downlink data to the UPF of the core network, when the serving base station fails to contact the mobile terminal when attempting delivery of the downlink data.

7. The method of claim 1, wherein the serving base station keeps context information of the mobile terminal in the RRC INACTIVE state.

8. The method of claim 1, further comprising:
by the mobile terminal, accessing to the serving base station in order to inform the serving base station of the cell chosen in the cell reselection process.

9. The method of claim 7, wherein the serving base station updates the context information of the mobile terminal in the RRC INACTIVE state in response to notification of the cell chosen in the cell reselection process.

10. The method of claim 1, wherein maintaining the connection between the mobile terminal in the RRC-INACTIVE state and the AMF of the core network during the cell reselection process includes:
maintaining a Non-Access Stratum (NAS) signaling connection between the mobile terminal and the AMF.

11. The method of claim 10, further comprising:
attempting, by the serving base station and based on receiving the downlink data, to activate the RRC-connected state with the mobile terminal.

12. A base station supporting mobility of a mobile terminal in telecommunication network, wherein the mobile terminal in a Radio Resource Control (RRC)-INACTIVE state is allowed to choose a suitable cell to camp from a serving cell and at least one neighboring cell according to a cell reselection criteria by performing measurements for the serving cell and the at least one neighboring cell to enable a cell reselection process, the base station comprising:
means for receiving downlink data associated with the mobile terminal in the RRC-INACTIVE state from User Plane Function (UPF), of the core network; and means for performing a paging in order to reach the mobile terminal in the RRC-INACTIVE state in response to receiving the downlink data associated with the mobile terminal,
wherein the mobile terminal in the RRC-INACTIVE state maintains a connection with an Access and Mobility Management Function (AMF) of a core network during the cell reselection process.

13. The base station of claim 12, further comprising:
means for notifying the AMF of the core network when the base station fails to contact the mobile terminal when attempting delivery of the downlink data.

14. The base station of claim 13, wherein, when delivery of the downlink data has failed and another base station controls the cell chosen in the cell reselection process, the downlink data is forwarded to the other base station.

15. The base station of claim 13, further comprising:
means for sending the downlink data to the AMF of the core network, when the base station fails to contact the mobile terminal when attempting delivery of the downlink data.

16. The base station of claim 14, further comprising:
means for sending the downlink data to the UPF of the core network, when the first base station fails to contact the mobile terminal when attempting delivery of the downlink data.

17. The base station of claim 12, further comprising:
means for keeping context information of the mobile terminal in the RRC INACTIVE state.

18. The base station of claim 17, wherein further comprising:
means for updating the context information of the mobile terminal in the RRC INACTIVE state in response to notification of the cell chosen in the cell reselection process.

19. The base station of claim 12, wherein the mobile terminal in the RRC-INACTIVE state maintains a Non-Access Stratum (NAS) signaling connection between the mobile terminal and the AMF.

20. A system comprising:
user equipment (UE); and
a base station communicating with the UE;
wherein the UE is configured to:
enter a Radio Resource Control (RRC)-INACTIVE state such that a signaling connection is maintained between the UE and an Access and Mobility Management Function (AMF) of a core network,
perform, based on the signaling connection is maintained between the UE and the AMF, measurements for a serving cell associated with the base station and at least one neighboring cell, and
select one cell from the serving cell and at least one neighboring cell based on the measurements, and
wherein the base station is configured to:
page the UE based on receiving downlink data for the UE, and
forward the downlink data when the base station is unable to contact the UE.

* * * * *